Patented Dec. 31, 1940

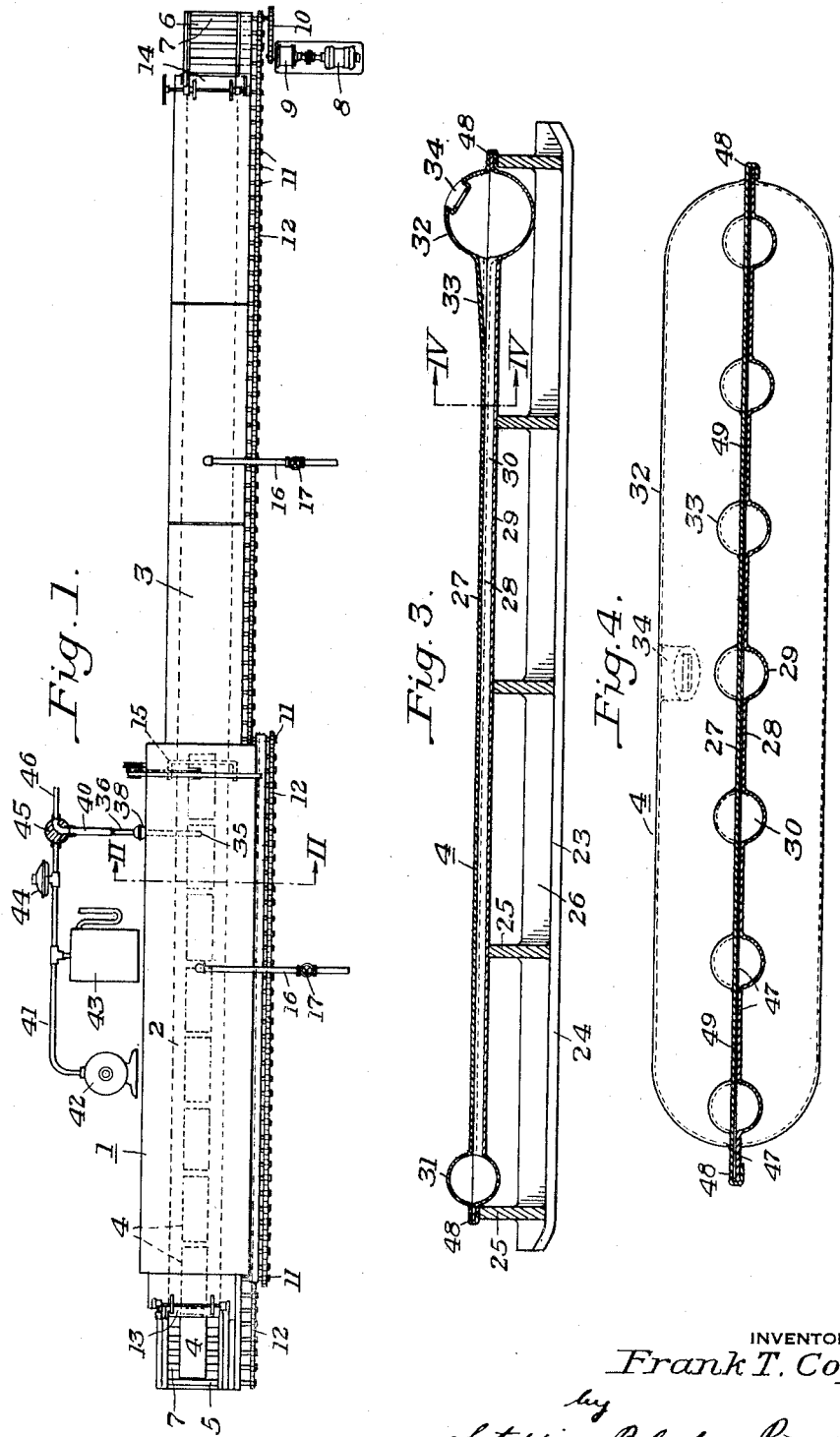

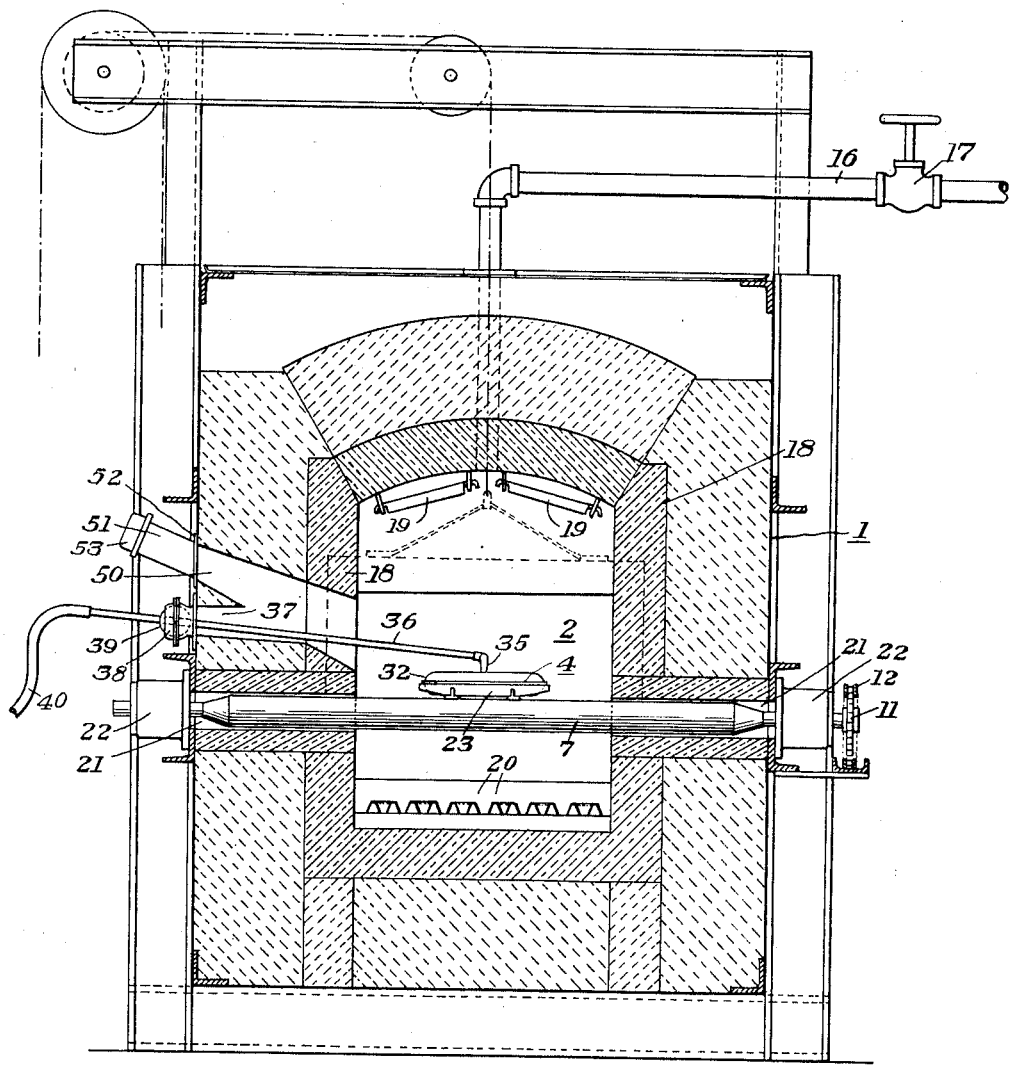

2,227,295

UNITED STATES PATENT OFFICE 2,227,295

APPARATUS FOR BRAZING

Frank T. Cope, Salem, Ohio, assignor to The Electric Furnace Company, Salem, Ohio, a corporation of Ohio Application October 22, 1938, Serial No. 236,500

2 Claims. (Cl. 113—59)

This invention relates generally to an apparatus for brazing and, although the invention is of general application, it is described herein more particularly as applied to the brazing of parts assembled to form a refrigerator evaporator. These evaporators are used in mechanical refrigerators and are formed of two generally flat sheets which have been stamped or otherwise formed to provide, when assembled, appropriate passages and cavities for refrigerant. The sheets, after having been brazed together, may thereafter be bent into the desired form for use in the refrigerator.

My Patent 2,023,354, granted December 3, 1935, describes a method and apparatus for brazing together the parts of an evaporator by applying vacuum to the space between the assembled parts. Vacuum is used for holding the parts together during the brazing operation, instead of clamping the parts between dies, which practice is objectionable because when the dies are heated they warp. The patent describes particularly the production of brass evaporators by placing the assembled parts in a furnace with brazing material between the parts at the contact areas, heating the assembly to brazing temperature and applying vacuum to hold them together. The present invention is for an improvement over that disclosed in my patent.

It has been found very desirable to produce evaporators of the same general form as disclosed in my patent but made of sheet steel instead of brass. Steel offers the advantages of lower cost and greater strength but the brazing of steel evaporators presents problems which do not arise in the manufacture of brass evaporators. In the manufacture of brass evaporators in a batch type furnace such as disclosed in my patent, it is feasible to preheat them to a temperature of, say, 400° below the brazing temperature in a separate oven or furnace before placing them in the heating furnace. They are then transferred to the heating furnace and brought up to brazing temperature and after brazing are removed from the furnace and are allowed to cool in the air. The oxidation which takes place during the preheating, the transfer from the preheating to the heating furnace and the cooling in air is relatively unimportant, because during the brazing operation "zinc sweating" invariably occurs, for the removal of which a pickling operation is necessary.

On the other hand, in the production of steel evaporators it is necessary to protect the assembly during the preheating period and the cooling period, as well as during the actual brazing operation, as otherwise the oxidation of the steel results in pitting of the surfaces, which no pickling operation can completely correct. It is, therefore, necessary in the production of steel evaporators to provide a protective atmosphere for the evaporator during all of the time it is at elevated temperature.

A further disadvantage of the batch type furnace is that only a single evaporator is in process at a given time, which seriously limits the productive capacity and accordingly makes the operation very expensive.

In the brazing of steel evaporators according to my improved process, I employ a continuous furnace which includes an elongated heating chamber providing a heating zone and a brazing zone, and a cooling chamber, the furnace being provided with means for introducing an inert or reducing gas thereto, so as to prevent oxidation of the assembly, and pass the assembled parts of the evaporator in succession through the heating zone, brazing zone and cooling zone on a suitable conveyor. The conveyor may be of the driven roller type, a woven wire belt, chain, or other suitable type of conveyor.

In the accompanying drawings, which illustrate the present preferred embodiment of my invention, Fig. 1 is a plan view of the furnace and associated parts;

Fig. 2 is a vertical transverse section of the furnace, on an enlarged scale, taken on the line II—II of Fig. 1;

Fig. 3 is a detail vertical longitudinal section through an evaporator and a tray on which it is supported during its passage through the furnace; and Fig. 4 is a vertical transverse section of an evaporator, on an enlarged scale, taken on the line IV—IV of Fig. 3.

Referring now more particularly to the accompanying drawings, a furnace designated generally by the reference numeral 1 has a heating chamber 2 and a cooling chamber 3 connected together in end to end relationship, so that the evaporator assemblies indicated by the reference numeral 4 pass from the charging table 5 through the heating and cooling chambers and are delivered by a discharge table 6. The evaporators are conveyed through the apparatus by rollers 7 driven from a motor 8 located near the discharge end of the furnace. The driving connections for the rollers may be varied but in the embodiment shown the motor operates through a speed reducer 9 and a chain 10 to rotate a roller 7 of the discharge table 6. Each of the rollers has a sprocket 11 on one end thereof driven by a chain 12. The conveyor rollers of the charging table, heating chamber, cooling chamber and discharge table are all operatively connected together as indicated and all are driven from the motor 8.

The heating chamber is provided with a door 13 adjacent the entrance end of the furnace, the cooling chamber is provided with a door 14 adjacent its exit end and there is a door 15 between the heating and cooling chambers. Protective atmosphere such as a neutral or reducing gas, is introduced into the heating chamber 2 and the cooling chamber 3 by means of pipes 16 provided with valves 17.

As shown more particularly in Fig. 2, the furnace has walls 18 enclosing the heating chamber 2. The heating chamber is heated by electric resistance heating elements 19 located above the conveyor rollers 7 and by other electric resistance heating elements 20 located below the rollers. Each of the conveyor rollers 7 extends through openings 21 in the side walls of the furnace and is mounted outside of the furnace in bearings 22.

Each of the evaporators in passing through the furnace and cooling chamber is supported on a tray 23, as shown in Fig. 3. The tray has longitudinal members 24 which rest on the conveyor rollers, and cross members 25 whose upper edges are adapted to carry the evaporator. The longitudinal members are preferably of ribbed section, in order to provide desirable strength. Each of the evaporators is made up of two sheets of steel 27 and 28, the upper sheet as shown in Fig. 3 being substantially flat throughout its extent and the lower sheet 28 being provided with longitudinally extending corrugations 29 forming passages 30 for the refrigerant. The passages communicate with headers 31 and 32 and the upper sheet is provided with corrugations 33 adjacent the large header 32. The header 32 is provided with an opening 34 adapted to receive a tip 35 of a nozzle 36 (Fig. 2), which is connected to a source of vacuum. The vacuum nozzle 36 extends through an opening 37 in the wall of the furnace and is mounted in a ball joint 38, so that the nozzle may be moved into various positions to adapt it to different positions of the evaporators in the furnace at the brazing zone. The nozzle 36 has a sliding fit with the ball 39 of the ball joint, so that the nozzle may not only be tipped into various positions but may also be slid through the ball to vary its position transversely of the furnace. The nozzle 36 is connected by a flexible conduit 40 and a conduit 41 to a vacuum pump 42, as shown in Fig. 1. A vacuum tank 43 also is connected to the conduit 41 and the conduit is provided with a vacuum regulating valve 44 and a three way valve 45, by means of which the interior of the evaporator may be connected either to the vacuum pump or to the outside atmosphere through a conduit 46.

In carrying out the process of brazing an evaporator according to the present invention, the steel sheets 27 and 28 are assembled as shown in Figs. 3 and 4 with an interposed sheet 47 of brazing material between them. The edges 48 of the sheets are squeezed together, so that the two sheets 27 and 28 and the interposed brazing sheet are in contact with each other and there also is contact at the areas 49 between the passages 30. The brazing sheet is preferably copper but any other suitable brazing material may be employed.

When the parts have been assembled, they are supported on a tray which is placed on the charging table 5. The furnace having been heated by the electric resistors and supplied with protective atmosphere through the pipes 16, the driving motor 8 is operated to convey the assembled evaporators through the furnace and cooling zone. The motor is preferably operated in an intermittent manner, so as to drive the rollers and pass the evaporators through the furnace and cooling chamber in a step by step manner. As one evaporator is charged into the furnace, another evaporator is discharged from the cooling chamber. The evaporators are heated during their passage through the heating chamber 2 and the speed of movement of the evaporators and the temperature of the furnace are regulated so that as each evaporator approaches the brazing zone in which the vacuum nozzle 36 is located, the evaporator is at at temperature which is slightly below the melting point of copper or other brazing material which may be employed. The heating of the evaporator to brazing temperature is completed while it is in the brazing zone and while the vacuum nozzle is connected to the evaporator so as to supply vacuum to the interior thereof. In order to allow the operator to accurately engage the vacuum nozzle with the evaporator, a sight hole 50 is formed in the furnace wall in combination with the opening 37 for the nozzle. A short section 51 of iron pipe is welded to a flange 52, which in turn is bolted to the casing. The outermost end of this pipe is threaded to receive a standard pipe cap 53 through the center of which a hole is drilled. The cap serves to clamp a disc of glass in place (with gaskets) against the end of the pipe. After the brazing has been completed, the vacuum nozzle is disconnected and the evaporator is moved forward again in a step by step manner and after passing through the cooling chamber 3 is discharged by the table 6. Suitable timing means of any known form may be used to control the operation of the motor 8, so as to cause the evaporators to move forward one step at a time at desired intervals.

The exact time necessary for heating an evaporator and for the application of the vacuum will, of course, depend upon the gauge of sheet metal used and upon other factors such as the exact form of the evaporator, disposition of heating elements in the furnace, etc. As an example, however, I have found that an evaporator made of .040" sheets with a .003" copper sheet for brazing material may be brought to the proper temperature for application of the vacuum in about 7½ minutes. Excellent brazing has resulted from a 1½ minute application of a vacuum of about 4" of mercury column, commencing at the expiration of the 7½ minute heating period above referred to. The best final temperature appears to be approximately 2050° F.

The present invention provides an improved method and apparatus for brazing parts together by the application of vacuum to the space between the parts to be brazed. The assembled parts are moved intermittently through a heating zone, a brazing zone and a cooling zone, and in each of these zones the parts are protected from oxidation by an inert or reducing atmosphere. The heating, brazing and cooling operations are carried out simultaneously on a plurality of evaporators, some of which are in each zone at any given time, thereby avoiding the loss of time which would be required for preheating and cooling the evaporators if they remained stationary in the furnace, rather than being moved therethrough. The use of protective atmosphere eliminates the necessity of pickling the evaporators, which was a necessary step in the treatment of brass evaporators after the brazing operation.

The term "brazing" is used in a general sense to include soldering or other similar methods of joining metal parts.

The invention is not limited to the preferred embodiment or method but may be otherwise embodied or practiced within the scope of the following claims.

I claim:

1. Apparatus for brazing contiguous parts assembled to provide a brazing area having brazing material between the parts at such area and a space between such parts and a hole opening from such space to which a vacuum nozzle may be applied, which comprises a furnace having an elongated heating chamber, a conveyor for carrying a line of assemblies longitudinally through the heating chamber, an opening in the side of the heating chamber, a manually operable vacuum nozzle extending through said opening transversely to the direction of travel of the assemblies through the furnace and having a tip adapted to be applied to the hole in an assembly to be evacuated, a mounting for the nozzle permitting universal movement of its tip in its application to and removal from an assembly, in the heating chamber, means for applying a vacuum to the nozzle, and a peep hole near the nozzle to permit the operator to observe the application of its tip to an assembly.

2. Apparatus for brazing contiguous parts assembled to provide a brazing area having brazing material between the parts at such area and a space between such parts and a hole opening from such space to which a vacuum nozzle may be applied, which comprises a furnace having an elongated heating chamber, a conveyor for carrying a line of assemblies longitudinally through the heating chamber, an opening in the side of the heating chamber, a vacuum nozzle extending through said opening transversely to the direction of travel of the assemblies through the furnace and having a tip adapted to be applied to the hole in an assembly to be evacuated, a mounting for the nozzle permitting universal movement of its tip in its application to and removal from an assembly in the heating chamber, and means for applying a vacuum to the nozzle.

FRANK T. COPE.